July 22, 1969   F. C. STEVENS   3,456,989
ANTISKID VEHICLE BRAKING SYSTEM
Filed April 12, 1967   3 Sheets-Sheet 1

INVENTOR.
FRED C. STEVENS
BY
ATTORNEY

July 22, 1969   F. C. STEVENS   3,456,989
ANTISKID VEHICLE BRAKING SYSTEM
Filed April 12, 1967   3 Sheets-Sheet 3

INVENTOR.
FRED C. STEVENS
BY
ATTORNEY

United States Patent Office 3,456,989
Patented July 22, 1969

3,456,989
ANTISKID VEHICLE BRAKING SYSTEM
Fred C. Stevens, 1 Garrett Place,
Bronxville, N.Y. 10708
Filed Apr. 12, 1967, Ser. No. 630,438
Int. Cl. B60t 8/02, 8/12; H01h 29/02
U.S. Cl. 303—21                                   2 Claims

ABSTRACT OF THE DISCLOSURE

A nonskid brake control system for vehicles wherein hydraulic wheel brakes are actuated from a master cylinder under foot pressure comprising a solenoid operated pressure relief valve connected in the hydraulic line heading from the master cylinder to at least the rear wheel brakes. The solenoid is connected to be energized from the stop light circuit through a centrifugal switch which is driven from the transmission and is set to close when the rate of rotation of the rear wheels falls to a value corresponding to a given vehicle speed, for example of five m.p.h., and to reopen when the rate increases to a value somewhat in excess of the closing rate. Thus, with the vehicle traveling at normal driving speed the brake fluid pressure is automatically relieved as the wheels approach locked condition.

---

This invention relates to automotive braking systems and more particularly to a system having anti-skid characteristics.

An object is to provide a system of the above type having improved means for preventing the application of locking pressure to the rear wheel brakes regardless of road conditions or car speed.

Another object is to provide a system of the above type having novel and improved characteristics.

Other objects and advantages will be apparent as the nature of the invention is more fully disclosed.

In one embodiment of the invention, a solenoid actuated pressure relief valve is connected in the fluid line between the master brake cylinder and the rear wheels in a manner to interrupt the transmission of fluid pressure to the rear wheels and to relieve in a controlled manner the pressure on the rear brakes. This valve is actuated in response to a speed responsive switch when the rate of rotation of the rear wheels falls to a selected minimum, for example, to a rate corresponding to a vehicle speed of five miles per hour. This would correspond to skid conditions if the vehicle were traveling at a speed greater than the selected speed.

Under these conditions the brake pressure is reduced and the wheels are allowed to resume turning at a rate corresponding to the vehicle speed. The locked wheel condition which produces skids is thus prevented from occurring. On the other hand, if the car speed has been reduced to the selected rate, the pressure remaining on the rear wheel brakes, together with the pressure on the front wheel brakes which has not been reduced, is sufficient to bring the vehicle to a stop.

The specific nature of the invention will be better understood from the following description, taken in connection with the accompanying drawings in which a specific embodiment has been set forth for purposes of illustration.

Figure 1:
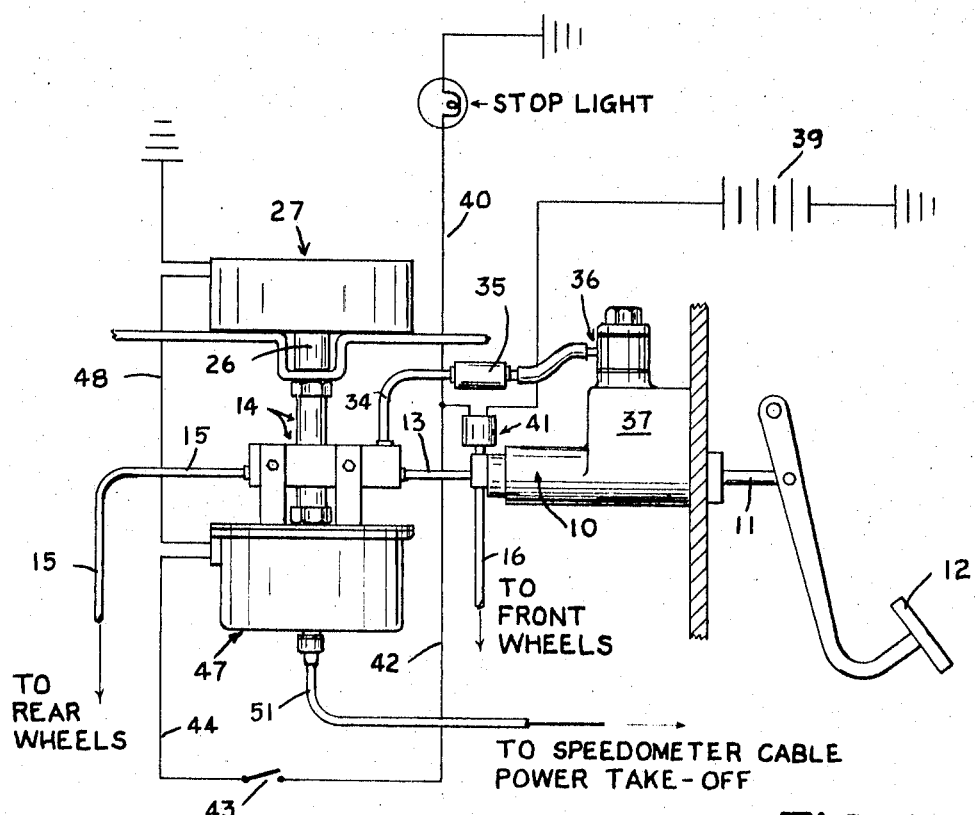
FIG. 1 is a diagrammatic view illustrating a braking system embodying the invention.

Referring to the drawings more in detail, the invention is shown as applied to a vehicle having conventional hydraulic braking mechanism including a master cylinder 10 actuated by a link 11 from the brake pedal 12. Fluid under pressure is fed from the master cylinder 10 by a line 13 to a relief valve 14 and by a line 15 to the rear wheel brake cylinders of the vehicle. The fluid under pressure is also supplied by a line 16 from the master cylinder 10 to the front wheel brake mechanism in the usual manner.

Figure 2:
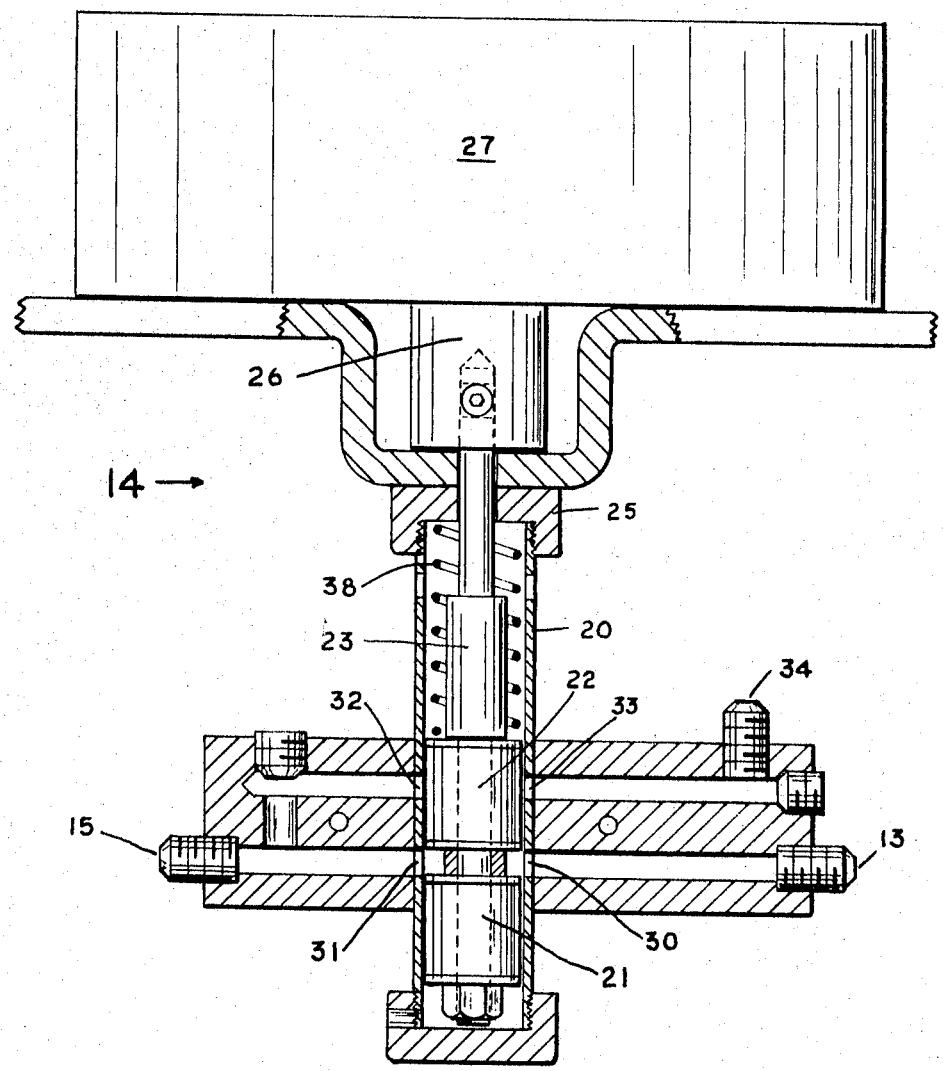
FIG. 2 is a detail section of the solenoid actuated pressure relief valve.

The relief valve 14 is shown in FIG. 2 as comprising a cylinder 20 having therein a pair of spaced pistons 21 and 22 connected by a rod 23 which extends through a closure cap 25 and is connected to the core 26 of the solenoid 27.

The cylinder 20 is provided with a pair of opposed ports 30 and 31 which communicate respectively with the master cylinder line 13 and the rear wheel line 15. These ports are positioned to be closed by the piston 21 when the piston is raised and to be uncovered for communication when the piston is in its lower position.

The cylinder 20 is also provided with a pair of ports 32 and 33 which communicate respectively with the rear wheel line 15 and with a line 34 connected through a check valve 35 and an adapter 36 to a fluid reservoir 37 from which the master cylinder is replenished. The ports 32 and 33 are positioned to be closed by the piston 22 when the latter is in its lower position and to be uncovered for communication when the piston 22 is raised by energization of the solenoid 27. A spring 38 returns the pistons to their lower positions when the solenoid is de-energized.

The solenoid 27 is energized from stop light conductor 40, connected through pressure responsive switch 41 to the battery 39. The pressure switch 41 is closed in response to fluid pressure from the master cylinder. The conductor 40 is connected by a conductor 42 to a manual switch 43, thence by a conductor 44 to a centrifugal switch 47, thence by conductor 48 to the solenoid 27, the other terminal of which is grounded.

Figure 5:
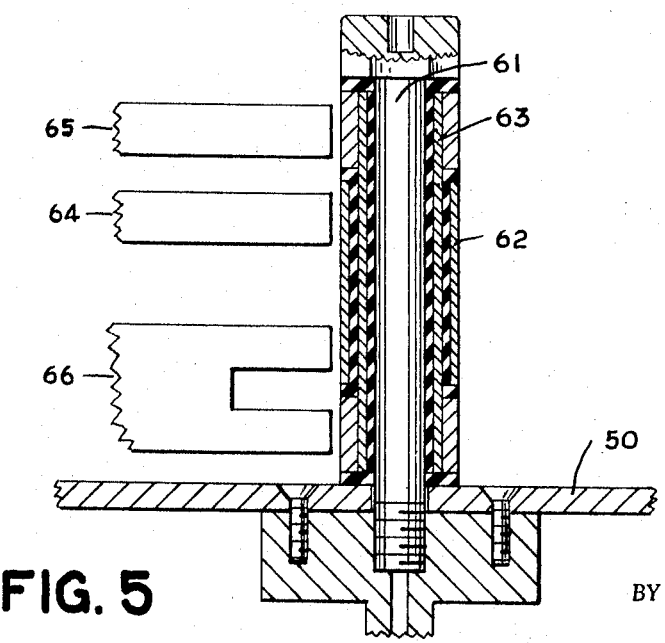
FIG. 5 is a detailed section taken on the line 5—5 of FIG. 3.
Figure 3:
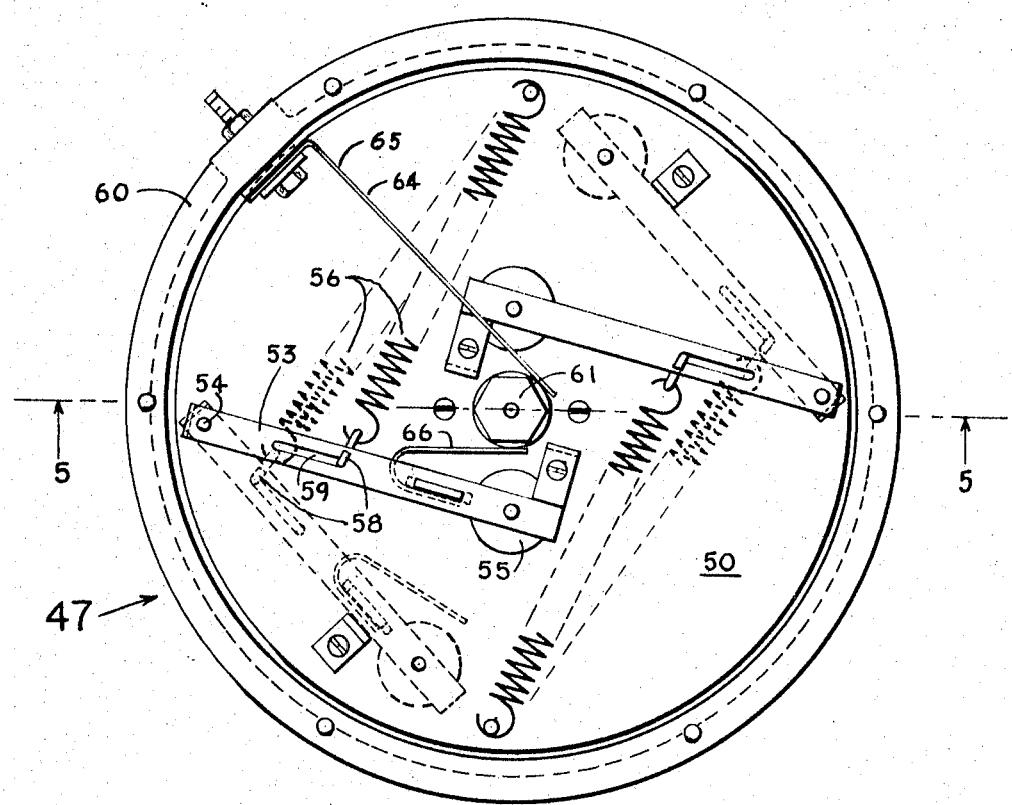
FIG. 3 is a plan detail view showing the centrifugal switch.
Figure 4:
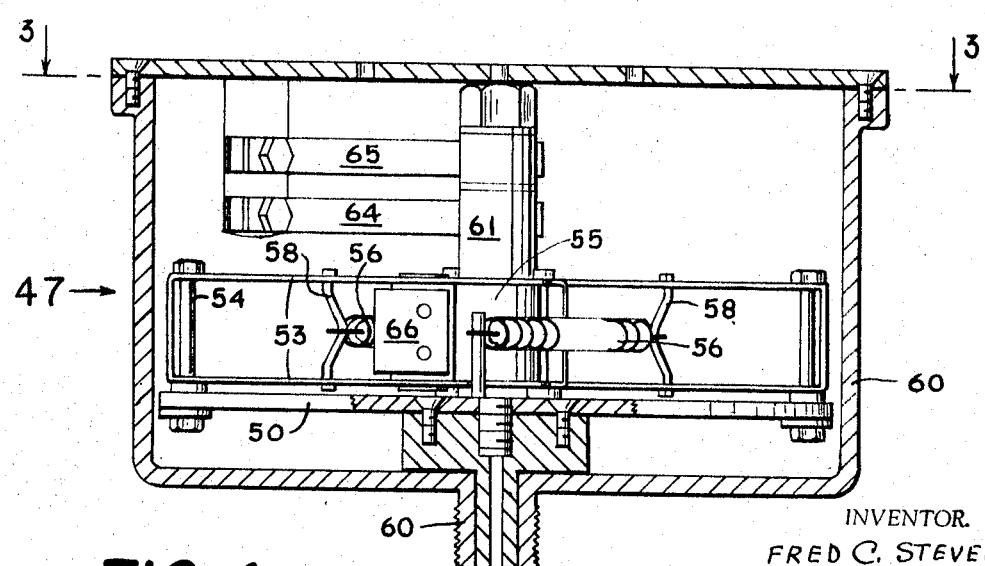
FIG. 4 is an elevation of the centrifugal switch of FIG. 3.

The centrifugal switch 47 is shown in FIGS. 3 to 5 as comprising a disc 50 mounted to rotate in a housing 60 and connected by a flexible shaft 51 to the transmission of the vehicle at a convenient point such as adajacent the connection of the usual speedometer cable. The disc 50 carries a pair of diametrically opposed pivoted arms 53 which are pivoted by pins 54 at points near the periphery of the disc 50 and, at their free ends, carry weights 55. The arms 53 are biased toward a center post 61 by springs 56 connected to the arms by pins 58 riding in slots 59 in the arms 53 so disposed that the pins slide to one end of the slots 59 when the arms are in their inward positions and slide to the other end of the slots when the arms are in their outer positions. The leverage on the arms is thus greater when the arms are in their inner positions than when the arms are in their outer positions.

Two arms with their corresponding weights are oppositely disposed on the disc 50 in order to provide for a balanced operation at all rotational speeds.

The center post 61 carries a pair of electrically insulated metal tubes 62 and 63 offset axially at their upper ends to form slip rings which are contacted by brushes 64 and 65, connected respectively to conductors 44 and 48. The metal tubes 62 and 63 are displaced axially at their lower ends to form contacts which are engageable by a contact element 66 carried by and insulated from one of the pivoted arms 53. The arrangement is such that the tubes 62 and 63 are interconnected by the element 66 for completing the circuit between the brushes 64 and 65 when the pivoted arms 53 are in their inner positions and are disconnected when the pivoted arms 53 are in their outer positions.

The arrangement is such that the arms 53 are held in their outer positions by centrifugal force when the rate of rotation exceeds a predetermined value and are retracted to their inner positions when the rate of rotation drops below this value. Due to the sliding action of the pins 58, a greater force is required to reopen the switch. Hence, if the switch closes at some minimum rate such as that corresponding to say a vehicle speed of five miles per hour, it will not reopen until the wheels regain a somewhat greater speed such as that corresponding to a vehicle speed of ten miles per hour. This eliminates hunting and provides a more stable operation.

In the operation of this system, when the vehicle begins to make a normal stop, the wheels continue to turn without slippage at the decreasing speed of the vehicle and to drive the disc 50 at a rate to hold the centrifugal switch open. The solenoid 27 is deenergized and the spring 38 holds the pistons 21 and 22 in retracted position. Brake fluid pressure is applied from the master cylinder 10 through the open ports 30 and 31 and line 15 to actuate the rear wheel brakes in the usual manner until the speed is reduced to the minimum selected value of say five miles per hour.

At this selected speed the centrifugal switch closes and energizes the solenoid 27 provided pressure switch 41 is closed thereby raising the pistons 21 and 22 to their upper positions at which the piston 21 closes the ports 30 and 31 and the piston 22 opens the ports 32 and 33. In this position the rear wheels brake line 15 is cut off from the master cylinder 10 and is connected through the ports 32 and 33 and line 34 to the brake fluid reservoir 37. The fluid pressure at the rear wheels brakes is thus reduced as line 15 is then connected to a lower pressure element. The opening of line 34 is small as compared to line 15 so that the reduction in pressure at the rear wheels is gradual and the brakes are released relatively slowly. In normal operation the vehicle will have been brought to a stop before any substantial reduction in braking effort occurs. In any event, the pressure remains on the front wheel brakes at all times so that the vehicle is always under control. When the brake pedal is released the pressure switch 41 opens and the solenoid 27 is deenergized regardless of the position of the pivoted arms 53 of the centrifugal switch 47. Hence, in restarting the vehicle, the brakes are under the normal control of the brake pedal.

In the event of a sudden stop on a slippery surface such as a wet road or even on ice, the brakes operate normally until the rear wheels begin to slip on the surface to an extent such that their rate of rotation falls to said selected value at which time the centrifugal switch 47 closes. The solenoid pressure relief valve is then actuated to interrupt the application of fluid pressure to the rear wheel brakes and to reduce the fluid pressure in the line 15 as above described. The braking pressure on the rear wheels is thus reduced until the wheels become released and again rotate at the speed of the vehicle. When this occurs the centrifugal switch again opens to deenergize the solenoid 27 and restore the control to normal until and if the wheels again approach locking conditions.

Due to the retardation in operation of the centrifugal control which is introduced by the pin and slot connection of the springs 56 to the arms 53, the centrifugal switch does not reopen until a speed in excess of the closing speed is reached. This prevents hunting or a fluctuating operation if the vehicle happens to be traveling at the critical closing speed.

It is obvious that the system may be applied to the control of all of the wheels if desired and that the nature and details of the various parts can be varied in a manner known to a person skilled in the art. The arrangement disclosed is intended to facilitate the installation of the system on existing vehicles and to minimize the expense of installations on new vehicles. The manual switch may be used when the system is to be rendered inoperative for any reason and may be located in a convenient position for actuation by the driver. Since the solenoid is energized from the stop light circuit the current is automatically interrupted when the brake pedal is released. Hence no extended drain on the battery can take place.

What is claimed is:

1. A nonskid control for the brake system of a vehicle having a hydraulic brake control including a master cylinder actuated by the brake pedal of the vehicle and including a fluid pressure line leading from the master cylinder to the brake cylinder of at least one of the vehicle wheels, said system comprising a remotely controlled valve in said fluid line between the master cylinder and the controlled brake cylinder and adapted, when closed, to block the supply of fluid pressure from said master cylinder to said brake cylinder, a centrifugal switch connected to be actuated in accordance with the rate of rotation of said wheel and connected to control the operation of said valve and to cause said valve to close when said rate of said wheel falls to a predetermined value, said centrifugal switch comprising a disc connected to be driven at a rate proportional to the rate of said wheel and carrying a pivoted arm, switch means actuated by said arm and spring means causing said switch means to be actuated when the centrifugal force acting on said arm falls to a selected value on deceleration, and means associated with said spring means to increase the moment on said arm to hold said switch means actuated until the centrifugal force acting on said arm reaches on acceleration a second predetermined value in excess of said closing value.

2. Apparatus as set forth in claim 1 in which said spring is connected to exert a closing moment on said arm, said spring being connected to said arm by a pin and slot connection adapted to vary the moment of said spring on said arm in closed and open positions.

References Cited

UNITED STATES PATENTS

| | | | |
|---|---|---|---|
| 2,850,121 | 9/1958 | Curl et al. | 188—181 |
| 2,874,810 | 2/1959 | Brown | 188—181 |
| 3,049,381 | 8/1962 | Zeigler | 303—21 |
| 3,291,538 | 12/1966 | Bulgin | 303—21 |

DUANE A. REGER, Primary Examiner

U.S. Cl. X.R.

188—181; 200—61.46